US010137930B2

(12) United States Patent
Pugsley et al.

(10) Patent No.: US 10,137,930 B2
(45) Date of Patent: Nov. 27, 2018

(54) METHOD FOR CONTROLLING A STEERING ACTUATOR COMPRISING A COUNTER-STEERING STEP BEFORE A DEACTIVATION STEP

(71) Applicant: RENAULT s.a.s., Boulogne-Billancourt (FR)

(72) Inventors: Gareth Pugsley, Bois d'Arcy (FR); Jerome Utter, Guyancourt (FR); Sylvain Facchin, Asnieres sur Seine (FR); Sandrine Calixte, Fontenay le Fleury (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/761,219

(22) PCT Filed: Dec. 12, 2013

(86) PCT No.: PCT/EP2013/076439
§ 371 (c)(1),
(2) Date: Jul. 15, 2015

(87) PCT Pub. No.: WO2014/117898
PCT Pub. Date: Aug. 7, 2014

(65) Prior Publication Data
US 2016/0052542 A1 Feb. 25, 2016

(30) Foreign Application Priority Data

Jan. 29, 2013 (FR) ..................... 13 50740

(51) Int. Cl.
*B62D 5/04* (2006.01)
*B62D 7/15* (2006.01)

(52) U.S. Cl.
CPC ......... *B62D 5/0496* (2013.01); *B62D 7/1581* (2013.01)

(58) Field of Classification Search
CPC ....... B62D 5/0496; B62D 7/15; B62D 7/1581
See application file for complete search history.

(56) References Cited

U.S. PATENT DOCUMENTS 5,295,550 A * 3/1994 Chikuma ................. B62D 6/02
180/412
2008/0196966 A1 8/2008 Maruyama et al.
(Continued)

FOREIGN PATENT DOCUMENTS

| EP | 1 958 850 | 8/2008 |
| EP | 1 964 754 | 9/2008 |
| EP | 2 415 653 | 2/2012 |

OTHER PUBLICATIONS

International Search Report dated Mar. 21, 2014, in PCT/EP2013/076439 Filed Dec. 12, 2013.
(Continued)

*Primary Examiner* — Tamara L Weber
(74) *Attorney, Agent, or Firm* — Oblon, McClelland, Maier & Neustadt, L.L.P.

(57) ABSTRACT

A method for controlling an actuator for steering a wheel of a motor vehicle including an electrical actuator controlling steering angle of the steering wheel and a mechanism determining temperature of the actuator. The method includes: completing deactivating the actuator; and a counter-steering operation triggered when the temperature of the actuator is higher than or equal to a determined prevention threshold.

8 Claims, 2 Drawing Sheets

(56) References Cited

U.S. PATENT DOCUMENTS

| | | | |
|---|---|---|---|
| 2008/0203690 A1 | 8/2008 | Horiuchi et al. | |
| 2008/0243339 A1* | 10/2008 | Nishimori | B60G 7/003 701/41 |
| 2011/0202239 A1 | 8/2011 | Maruyama et al. | |
| 2012/0041649 A1 | 2/2012 | Yanagi | |

OTHER PUBLICATIONS

French Search Report dated Sep. 27, 2013 in French Application 13 50740 Filed Jan. 29, 2013.

* cited by examiner

METHOD FOR CONTROLLING A STEERING ACTUATOR COMPRISING A COUNTER-STEERING STEP BEFORE A DEACTIVATION STEP

The invention relates to a method for controlling a steering actuator of at least one motor vehicle wheel.

The invention relates more particularly to a method for controlling a steering actuator of at least one motor vehicle wheel, the vehicle comprising:
- at least one steered wheel mounted pivotably between two extreme angular steering positions on either side of a neutral reference position;
- an electric actuator which controls the steering angle of the steered wheel relative to the neutral reference position on the basis of operating parameters of the vehicle; and
- means for determining the temperature of the actuator;

the method comprising a step of total deactivation of the actuator.

Motor vehicles conventionally comprise two front wheels and two rear wheels. The front wheels are steered wheels whose steering angle is controlled directly by the driver by means of the steering wheel. Usually, the two rear wheels are not pivotable.

To improve the roadholding and maneuvering of motor vehicles, there is a known way of producing motor vehicles in which all four wheels are steered wheels. Thus, in addition to the two front steered wheels, the rear wheels are also mounted pivotably so as to follow the turning of the vehicle.

However, the rear steered wheels generally have a much smaller steering angle than the front steered wheels; for example, the rear wheels have a maximum play of 3.5° on either side of their neutral reference position.

The angular position of the rear wheels is controlled solely by an electric actuator which is controlled by an electronic control unit on the basis of running parameters such as the speed of the vehicle and the angle of rotation of the steering wheel.

The angular position of the front wheels can also be controlled by this actuator.

For example, when the vehicle runs at more than a first specified speed, the rear wheels are steered in the opposite direction to the front wheels in order to decrease the turning circle of the vehicle. This can improve the maneuverability of the vehicle. Conversely, when the vehicle runs at less than a second specified speed, the rear wheels are steered in the same direction as the front wheels, but with a different angle, so as to improve the roadholding of the vehicle when cornering.

The actuator used for controlling the steering angle of the rear wheels comprises an electric motor, for example a three-phase brushless motor. This actuator consists of an electric linear actuator, for example.

In use, notably if the torque required to turn the rear wheels is high, the temperature of the actuator also increases. If the actuator is used intensively, there is no time for its temperature to fall between two successive uses. The actuator temperature then reaches levels that may damage certain elements of the actuator, notably the electronic elements.

This temperature rise may be promoted by a high ambient temperature.

To prevent irreversible degradation of the electric actuator, there is a known way of fitting the actuator with means for determining its temperature. Such means may be, for example, a sensor which measures the temperature, or a temperature estimator.

If the temperature determined by these means exceeds an alarm threshold, a method of degraded operation, called a "derating" method in the terminology of the field, is used. This method temporarily, but completely, interrupts the control of the electric actuator. The wheels then remain locked in their last position, which may, notably, be other than the neutral position.

Thus this method allows the actuator temperature to fall to an acceptable operating temperature.

However, if the wheels are locked in an angular position other than the neutral position, the vehicle can continue to run with the wheels locked in an angular steering position other than the neutral position, in which case the vehicle moves "crabwise", although the steering angle formed by the rear wheels with the longitudinal axis of the vehicle remains small, at less than 3.5°. This form of running is not optimal for safety, and may create a poor image of vehicles of this make.

To overcome these problems, the invention proposes a method of the type described above, characterized in that the method comprises a counter-steering step which is initiated if the temperature of the actuator is greater than or equal to a specified prevention threshold, the prevention threshold being below the alarm threshold, during which step the rear wheel is returned toward its neutral position by the actuator.

According to other characteristics of the invention:
- in the counter-steering step (E1), the rear wheel (14) is returned to a neutral position at a lower pivoting speed than the pivoting speed in normal operation;
- in the counter-steering step (E1), the order to counter-steer the steered wheel (14) takes priority over any other steering instruction;
- the step (E2) of deactivating the actuator is initiated at the end of the first counter-steering step (E1) as soon as the steered wheel (14) has returned to its neutral position;
- the counter-steering step (E1) is interrupted and the deactivation step (E2) is initiated when the temperature (T) of the actuator (18) reaches an alarm threshold (T1);
- the prevention threshold (T3) is below the alarm threshold (T1);
- the method comprises a step of reactivating the actuator, which is initiated immediately after the deactivation step when the actuator temperature has returned below an operating threshold;
- the operating threshold is below the prevention threshold;
- if the deactivation step is initiated when the wheel has not returned to its neutral position, driver alarm and information means are activated;
- the pivoting of the steered wheel is controlled solely by the actuator;
- the vehicle comprises four wheels, including two steered wheels controlled by the actuator, which are arranged at the rear of the vehicle.

Other characteristics and advantages of the invention will be evident from the following detailed description, the comprehension of which will be facilitated by reference to the attached drawings, in which.

Elements having an identical structure or similar functions will be denoted below by the same reference numerals.

Figure 1:
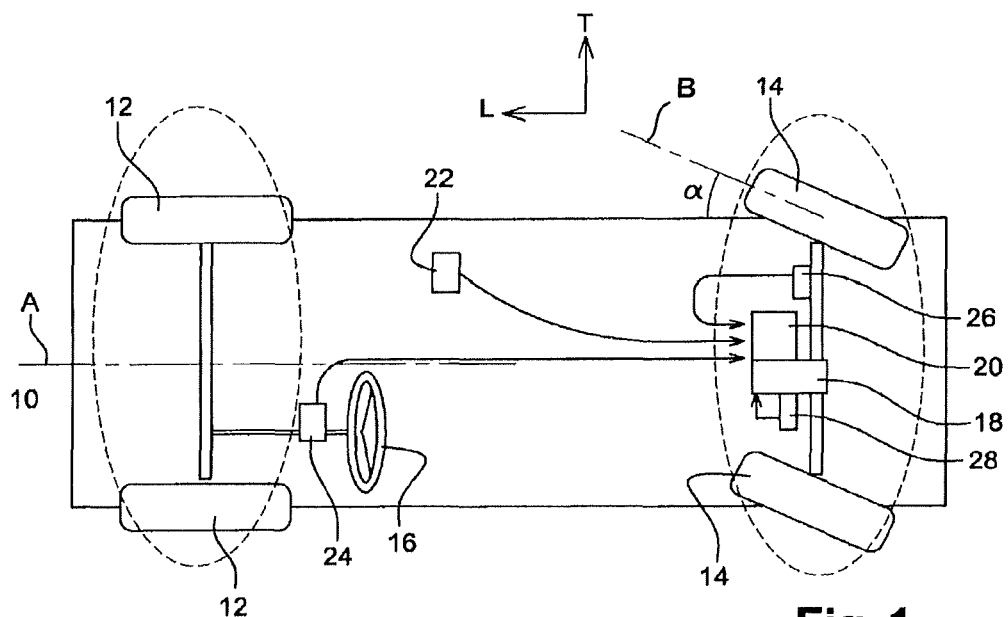
FIG. 1 is a schematic view, showing a motor vehicle whose rear wheels are operated so as to pivot by an actuator.

A longitudinal orientation running from the rear to the front, indicated by the arrow "L" in FIG. 1, and a transverse orientation, indicated by the arrow "T" in FIG. 1, are used below.

FIG. 1 shows a motor vehicle 10 with a longitudinal axis "A", comprising two front wheels 12 and two rear wheels 14. The two front wheels 12 are mounted so as to turn about a common axle.

The two front wheels 12 are steered wheels which are mounted between two extreme angular steering positions on either side of a neutral position. The front wheels 12 are shown in the neutral position in FIG. 1. In a known way, the angular steering position of the front wheels 12 is controlled by a steering wheel 16 via a steering column.

The two front wheels 14 are steered wheels which are mounted pivotably between two extreme angular steering positions on either side of a neutral reference position.

The angular steering position is determined by the steering angle "a" formed between the plane "B" of the wheel 14 and the longitudinal axis "A" of the vehicle. In the neutral reference position, the steering angle "a" of the rear wheel 14 is equal to zero. The extreme steering position of the rear wheel 14 corresponds, for example, to a steering angle "α" of 3.5°.

The vehicle 10 also comprises an electric steering actuator 18 which controls the steering angle "α" of each rear wheel 14. The actuator 18 simultaneously controls the pivoting of the two rear wheels 14. The pivoting of the rear wheels 14 is controlled solely by the actuator 18.

In this case, the actuator 18 consists of an electric linear actuator.

The actuator 18 is controlled by an electronic control unit 20 on the basis of operating parameters of the vehicle. The vehicle comprises, notably, a sensor 22 of the speed of advance of the vehicle and a sensor 24 which measures the angle of rotation of the steering wheel 16. These two sensors 22, 24 send a signal representative of their respective measurements to the electronic control unit 20. Thus the electronic control unit 20 establishes a steering instruction for the rear wheels 14, notably on the basis of the measured speed of the vehicle and the measured angle of rotation of the steering wheel 16.

The vehicle 10 also comprises a sensor 26 of the position of the actuator 18, which enables the electronic control unit 20 to know the angular steering position of the rear wheels 14 at any moment.

The vehicle 10 also comprises means for determining the temperature of the actuator 18. In this case, these means are a temperature sensor 28 which directly measures the temperature "T" of the actuator 18, or at least a temperature representative of the temperature of some thermally vulnerable elements.

This temperature "T" is communicated to the electronic control unit 20 in order to apply a method of protecting the actuator 18 in case of an excessively high temperature "T". This method is also known under the English name of the "derating method".

Figure 2A:
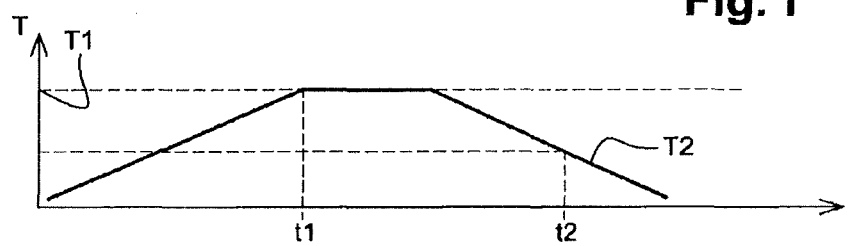
FIG. 2A is a diagram showing the actuator temperature as a function of time when the wheels are operated by a method applied according to the prior art.
Figure 2B:
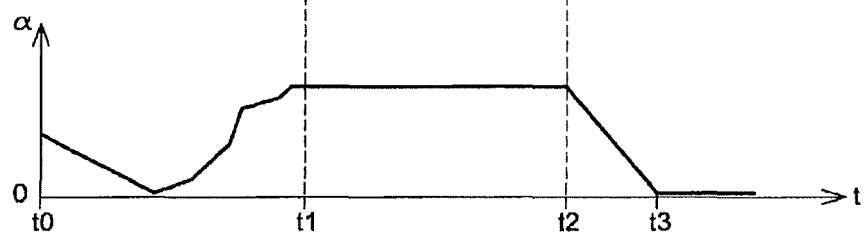
FIG. 2B is a diagram showing the steering angle of the wheels as a function of time when the wheels are operated by the method applied according to the prior art.

FIGS. 2A and 2B show this method applied according to the prior art.

The method comprises a step of total deactivation of the actuator 18 if the temperature "T" of the actuator is greater than or equal to a predetermined alarm threshold "T1".

As shown in FIG. 2A, between the instants "t1" and "t2" the temperature of the actuator 18 is below the alarm threshold "T1". The actuator 18 is therefore free to make the steering angle "α" of the rear wheels 14 vary to comply with the steering instruction.

If the temperature exceeds the alarm threshold "T1", as shown after the instant "t1", the actuator 18 is deactivated regardless of the angular steering position of the rear wheels 14. In the example shown in FIG. 2B, the rear wheels 14 are locked in an angular steering position which is different from the neutral position.

This situation persists until the temperature "T" of the actuator has fallen back below an operating threshold "T2". The operating threshold "T2" is below the alarm threshold "T1". The actuator 18 is then reactivated to cause the rear wheels 14 to pivot toward their neutral position, as shown after the instant "t2" in FIG. 2B.

This prior art method enables the actuator 18 to be effectively protected. However, if the actuator 18 is deactivated while the rear wheels 14 are not occupying their neutral position, the vehicle may still advance in a "crabwise" manner, with its rear wheels remaining steered into a position which is not optimal for driving safety.

To overcome this problem, the invention proposes a method of controlling the actuator 18 which is simple to apply and does not require any modification of the vehicle relative to the prior art method. The method according to the invention can be used to reduce the frequency of cases in which the rear wheels are locked in a position other than the neutral position.

The method according to the invention will now be described with reference to FIGS. 3A, 3B and 4.

The method comprises a first counter-steering step "E1" which is initiated if the temperature "T" of the actuator 18 is greater than or equal to a specified prevention threshold "T3". The prevention threshold "T3" is below the alarm threshold "T1" defined in the method described above. In this first step "E1", the rear wheels 14 are moved toward their neutral or counter-steering position by the actuator. In this first step (E1), the counter-steering of the rear wheels 14 is carried out at a pivoting speed substantially below the pivoting speed in normal operation. Thus the counter-steering of the rear wheels is preferably carried out at a speed of about 1°/s, instead of the speed of 10°/s in normal operation, in order to return the rear wheels safely to the neutral position, while also avoiding a rise in the actuator temperature.

The method comprises a step "E2" of temporary deactivation of the actuator until the temperature "T" falls back to a level below an operating threshold "T2". The operating threshold "T2" is, evidently, below the prevention threshold "T3". Step "E2" must be initiated if the temperature exceeds the alarm threshold "T1".

The method comprises a step E4 of reactivating the actuator when the temperature "T" has fallen back to a level below the operating threshold after the deactivation step "E2".

Figure 3A:
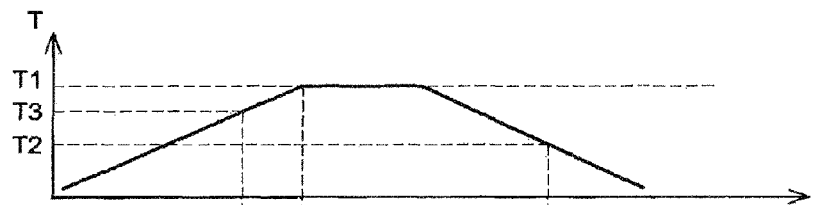
FIG. 3A is a diagram similar to that of FIG. 2A, showing the actuator temperature as a function of time when the wheels are operated by a method applied according to the teachings of the invention.
Figure 3B:
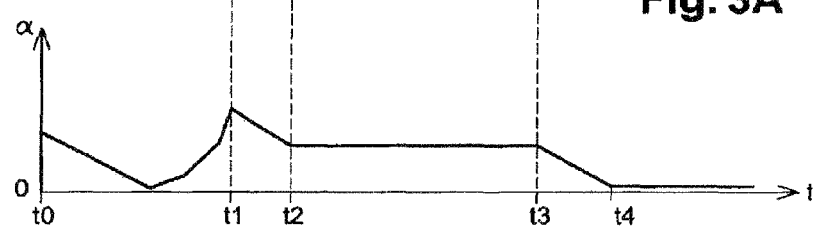
FIG. 3B is a diagram similar to that of FIG. 2B, showing the steering angle of the wheels as a function of time when the wheels are operated by the method applied according to the teachings of the invention.
Figure 4:
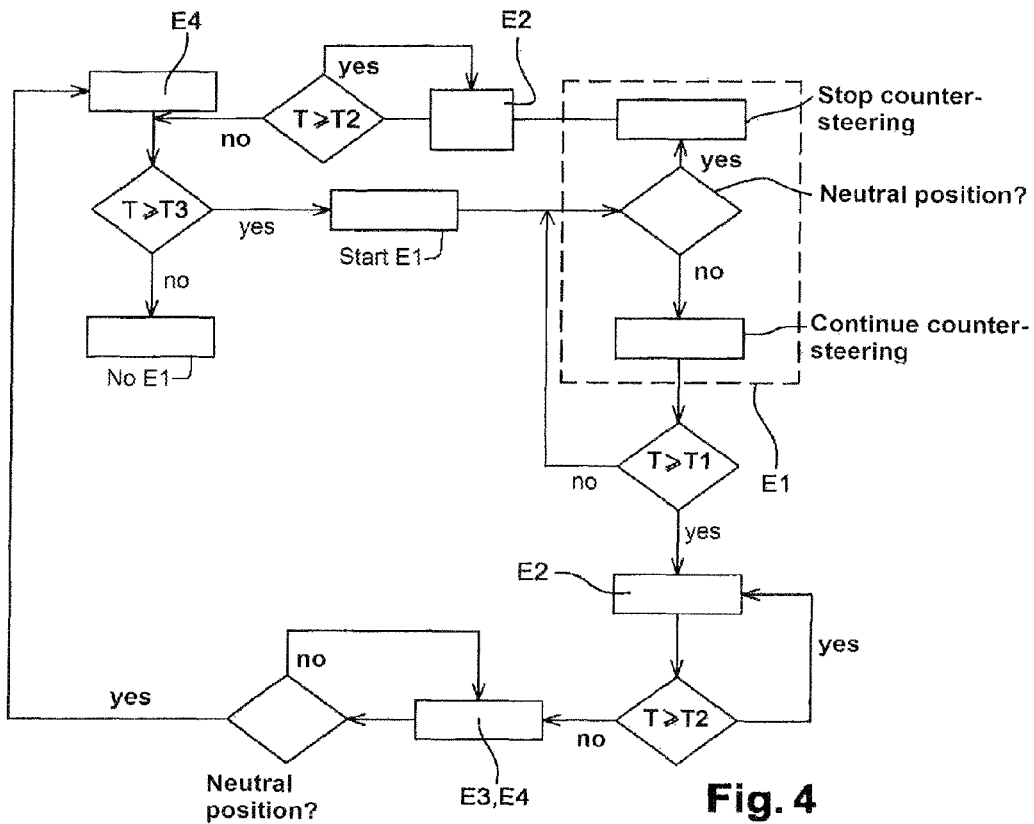
FIG. 4 is a block diagram showing the various steps of the method applied according to the teachings of the invention.

The first step "E1" is illustrated in FIGS. 3A and 3B between instants "t1" and "t2". It can be seen, notably, in FIG. 3B that the steering angle "α" of the rear wheels 14 decreases.

During driving, the temperature of the actuator 18 is communicated to the electronic control unit by the temperature sensor 18. If this exceeds the prevention threshold "T3", the electronic unit starts step "E1" and ceases to take the rear wheel steering requests into account. In other words, in step "E1", the counter-steering order sent by the electronic control unit takes priority over any other steering instruction, regardless of the running conditions.

Advantageously, step "E2" is initiated as soon as the rear wheels (14) reach their neutral position, even if the temperature "T" of the actuator 18 does not reach the alarm threshold "T1". Thus the temperature of the actuator 18 is able to fall back below the operating threshold "T2". Any inconvenience for the driver is less noticeable because the counter-steering takes place at a lower speed and, since the rear wheels remain in their neutral position, the operation of the vehicle is little affected.

If the temperature "T" has actually fallen back below the operating threshold "T2", the actuator 18 is reactivated in a final reactivation step "E4", after which the method is repeated.

However, if the rear wheel 14 has not returned to its neutral position when the temperature "T" reaches or exceeds the alarm threshold "T1", the counter-steering step "E1" is interrupted and the step "E2" of deactivating the actuator is initiated, the rear wheels then being locked in their last angular steering position. This situation is illustrated in FIG. 3B, between instants "t2" and "t3".

Driver alarm and information means are then activated. These means are, for example, signaling means for warning the driver that the rear wheels 14 are locked in their steering position, and that driving may be temporarily degraded. The driver may, if necessary, decide to reduce speed or stop the vehicle.

Step "E4" of reactivating the actuator 18 is initiated immediately after the deactivation step "E2" if the actuator temperature "T" has fallen back below the operating threshold "T2". The rear wheels 14 are then still locked in their last steering position.

Simultaneously with the final step "E4", a third step "E3" of returning the rear wheels 14 to the neutral position is initiated. During this third step "E3", the rear wheels 14 are moved toward their neutral position. This third step "E3" is illustrated in FIG. 3B, between instants "t3" and "t4".

Thus this method enables the rear wheels 14 to be returned toward their neutral position before the actuator is deactivated.

Depending on the adjustment of the prevention threshold "T3", the rear wheels 14 may return to their neutral position when their steering angle "α" is less than a limit angle allowing the return to zero.

Even when the method does not enable the rear wheels 14 to be returned to their neutral position, their steering angle "α" is still substantially reduced. Thus the rear wheels 14 can no longer be locked in their extreme steering position. This can facilitate the operation of the vehicle 10 by the driver when the running conditions do not allow the vehicle to be immobilized immediately.

Moreover, the application of this method according to the invention is inexpensive, since it does not require the addition of any supplementary equipment to the vehicle relative to the prior art method.

The invention claimed is:

1. A method for controlling a steering actuator of at least one wheel of a motor vehicle, the motor vehicle including at least one steered wheel mounted pivotably between two extreme angular steering positions on either side of a neutral reference position, the motor vehicle further including an electric actuator which controls a steering angle of the steered wheel relative to the neutral reference position based on operating parameters of the motor vehicle, and the motor vehicle further including a sensor to determine a temperature of the electric actuator, the method comprising:
initiating a counter-steering while the motor vehicle is driven when the temperature of the electric actuator is greater than or equal to a specified prevention threshold, during which the steered wheel is moved toward its neutral position by the electric actuator,
as long as the temperature of the electric actuator is higher than the specified prevention threshold but lower than an alarm threshold, initiating deactivation of the electric actuator at an end of the counter-steering as soon as the steered wheel has returned to its neutral position, and
when the temperature of the electric actuator reaches the alarm threshold, interrupting the counter-steering and initiating the deactivation of the electric actuator.

2. The method as claimed in claim 1, wherein, in the counter-steering, a rear wheel is returned to a neutral position at a pivoting speed below a pivoting speed in a normal operation.

3. The method as claimed in claim 1, wherein, in the counter-steering, an order to counter-steer the steered wheel takes priority over any other steering instruction.

4. The method as claimed in claim 1, further comprising reactivating the electric actuator, which is initiated immediately after the deactivating when the temperature of the electric actuator has fallen back below an operating threshold.

5. The method as claimed in claim 4, wherein a specified prevention threshold is below an alarm threshold.

6. The method as claimed in claim 1, wherein, when the deactivating is initiated when the steered wheel has not returned to its neutral position, an alarm is activated.

7. The method as claimed in claim 1, wherein pivoting of the steered wheel is controlled solely by the electric actuator.

8. The method as claimed in claim 7, wherein the motor vehicle comprises four wheels, including two steered wheels controlled by the electric actuator, which are arranged at a rear of the motor vehicle.

* * * * *